United States Patent [19]

Johnson et al.

[11] 4,202,207

[45] May 13, 1980

[54] UNIT INJECTOR TIMING GAGE

[75] Inventors: Gary W. Johnson, Bloomfield Hills; Carl J. Robinson, Pontiac, both of Mich.

[73] Assignee: General Motors Corporation, Detroit, Mich.

[21] Appl. No.: 5,952

[22] Filed: Jan. 24, 1979

[51] Int. Cl.[2] .............................................. G01M 15/00

[52] U.S. Cl. .................................................... 73/119 A

[58] Field of Search ................ 73/119 A; 33/DIG. 15, 33/143 L, 172 E, 169 B, 180 AT, 181 AT; 200/61.41, 61.42, DIG. 13, DIG. 17

[56] References Cited

U.S. PATENT DOCUMENTS 3,903,609 9/1975 Brown ............................ 33/169 B X 4,098,233 7/1978 Boyd .................................. 123/32 R

*Primary Examiner*—Jerry W. Myracle

*Attorney, Agent, or Firm*—Arthur N. Krein

[57] ABSTRACT

A timing gage for the unit injector of a diesel engine includes a timing gage sleeve adapted to encircle the extended plunger follower of an injector so as to permit its abutment against a fixed element thereof or of the engine next adjacent to the injector. The contact pin carrys with it a portion of an electrical circuit arrangement, including a timing light that is adapted for movement relative to a contact gage base, secured to the timing gage sleeve, between a closed electrical circuit connection therewith and an open electrical circuit therewith. The contact pin upon engagement with the plunger follower when at a predetermined height is then operative to effect energization of the timing light whereby to indicate proper setting of injector timing for that injector.

3 Claims, 3 Drawing Figures

UNIT INJECTOR TIMING GAGE

This invention relates to the timing of injectors in diesel engines and, in particular, to a timing gage for use in setting the timing of individual unit type fuel injectors on a diesel engine.

In one type of diesel engine, unit type fuel injectors are provided to effect injection of fuel into the cylinders of the engines. In this type diesel engine, a unit type fuel injector is associated with each cylinder of the engine. Such unit type fuel injectors are positioned so as to inject fuel into an associated cylinder of the engine and are located so as to be operated through a suitable drive mechanism by the camshaft of the engine. For example, such a drive mechanism normally includes a suitable tappet riding on an associated cam of the camshaft driven from the crankshaft of the engine in proper timed relationship therewith. The tappet is used to impart reciprocating movement to a push rod that acts against on one end of a pivotable supported rocker arm. The opposite end of the rocker arm is operatively connected to the plunger follower of the unit injector whereby to effect reciprocating movement thereof in the opposite direction to that of the push rod.

Since fuel injection from each fuel injector must be timed as a function of the movement of the piston within the associated cylinder, and since manufacturing tolerances and wear of the above-described parts can effect such timing, means are normally provided for adjusting the drive mechanism for the individual injectors associated with a cylinder, independently of the driven mechanisms for the injectors associated with the other cylinders of the engine. This adjustment is normally accomplished by gaging a predetermined height or outward extension of the plunger follower of the injectors in a particular engine relative to a fixed located on the injector, per se, or to a fixed location on the cylinder head on which the injector is mounted. The rocker arm is then adjusted so as to engage the plunger follower at this predetermined gage height when the associated tappet is riding on the null portion of the associated cam.

Various mechanical timing engagements are currently in use to effect such timing, as described and disclosed, for example, in U.S. Pat. No. 4,098,233, entitled "Timing Gage For Diesel Engines" issued July 4, 1978 to Darrell B. Boyd. However, both the prior art timing gage discussed in this patent and the timing gage disclosed therein are subject in use to operator errors. This will appear somewhat self evident since it will be apparent that the mechanic using such a mechanical type gage to effect the proper setting of injector timing must have just the right feel in the use of the gage mechanism to determine the desired predetermined axial extent of the plunger follower of the injector for a particular engine.

It is therefore a primary object of this invention to provide an improved timing gage which is in the form of an electrical continuity testor that is operative upon proper setting of the height of the plunger follower of an injector to effect illumination of a signal light to indicate that this proper height of the plunger follower relative to a predetermined fixed referenced point on the engine has been established.

Another object of this invention is to provide an improved unit injector timing gage which has an adjustable gage feature whereby the gage can be used to set the timing for various unit injectors and engine applications thereof.

A further object of this invention is to provide an improved unit injector timing gage that is operative whereby to eliminate human error in the use thereof.

For a further understanding of the invention, as well as other objects and further features thereof, reference is had to the following detailed description of the invention to be read in connection with the accompanying drawings, wherein.

Figure 1:
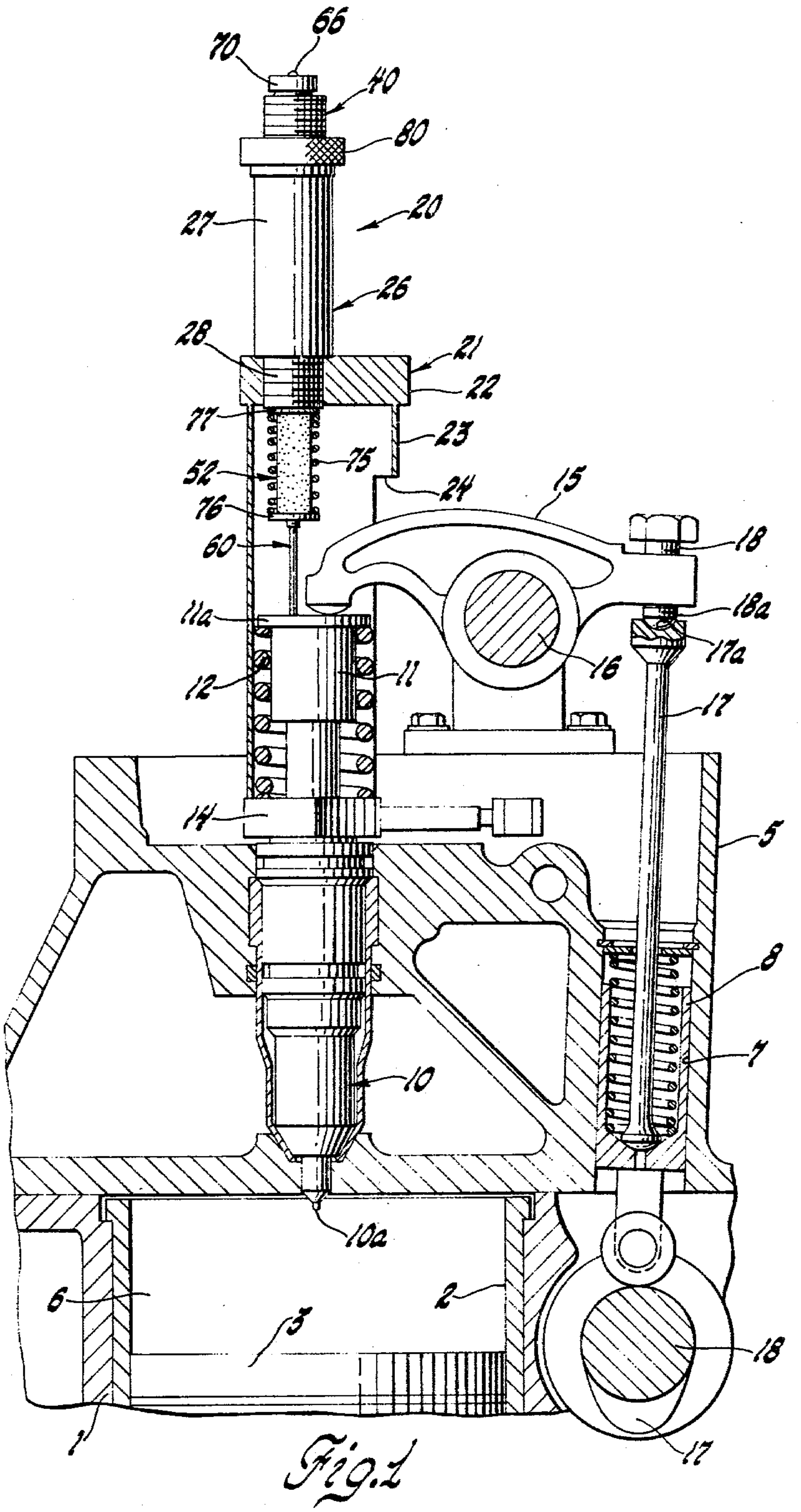
FIG. 1 is a fragmentary cross sectional view in elevation of a diesel engine, with parts omitted, showing a unit fuel injector and its actuator mechanism, and a timing gage in accordance with the invention associated therewith.

Referring first to FIG. 1 there is shown a portion of a conventional diesel engine that includes an engine cylinder block 1 having one or more cylinders 2 formed therein, only one cylinder being shown. A piston 3 operatively connected to a crank shaft, not shown, is reciprocably journaled in each cylinder 2 to form therewith and with a cylinder head 5 suitably fixed to the engine cylinder block 1 a combustion chamber 6.

A conventional unit type fuel injector 10 is associated with each cylinder 2 of the engine block. As shown, each unit injector 10 is positioned and retained in a manner, not shown, in the cylinder head 5 above its associated cylinder 2 whereby the spray tip end 10*a* thereof is positioned so as to inject fuel into the cylinder. The plunger follower 11 of the injector 10 extends outward from the housing 14 thereof so as to be engaged by a suitable drive or actuator mechanism. The plunger follower 11 is provided at its free end with an enlarged head 11*a* against which one end of the return spring 12 for the plunger follower abuts. The return spring 12 loosely encircles the plunger follower and has its other end, as shown, abutting against the upper surface of the injector housing 14. Injector housing 14, as usual, is made of electrical conductive material.

In the construction shown, the unit injector 10 is operated by a rocker arm 15 pivotly mounted intermediate its end on a rocker shaft 16 suitably supported on the engine, in a manner whereby the rocker shaft extends parallel to the line of the cylinders 2. One end of the rocker arm 15 is thus located so as to abut against the head 11*a* of the plunger follower 11 while the opposite end of the rocker arm is adapted for operative connection to one end of a push rod 17.

In the particular embodiment shown, this end of the rocker arm 15 is provided with an internally threaded bore, not shown, receiving an injector adjustment screw 18. The injector adjustment screw 18 at its free shank end is provided with a semi-spherical seat 18*a* for engagement in the concave socket end 17*a* of the push rod 17. As is conventional, the push rod 17 is reciprocably mounted with its opposite or lower end thereof abutting against an element of a conventional tappet 8. The tappet 8 is slidably received in a tappet guide bore 7 in the engine cylinder block so as to be in sliding engagement with a cam 17 on the camshaft 18 of the engine. As is conventional, the camshaft 18 is driven from the engine crankshaft, not shown, in timed relation therewith.

Figure 2:
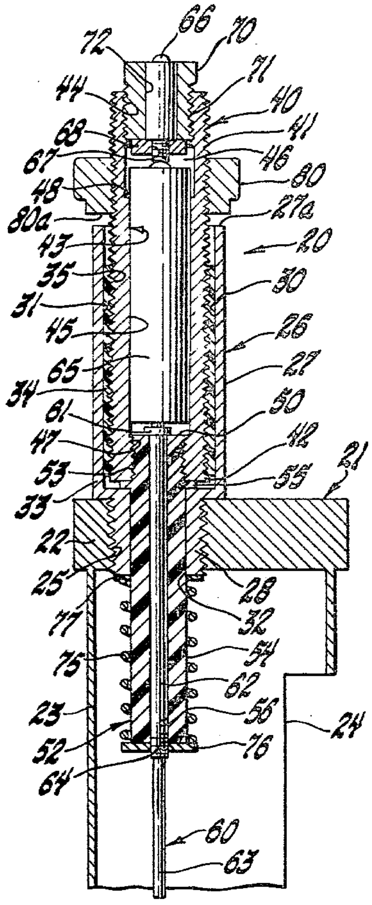
FIG. 2 is an enlarged sectional view in elevation of the timing gage of FIG. 1 constructed in accordance with the invention and, FIG. 3 is a sectional view of the timing gage of FIG. 2 mounted on a calibration gage block for a particular engine.
Figure 3:
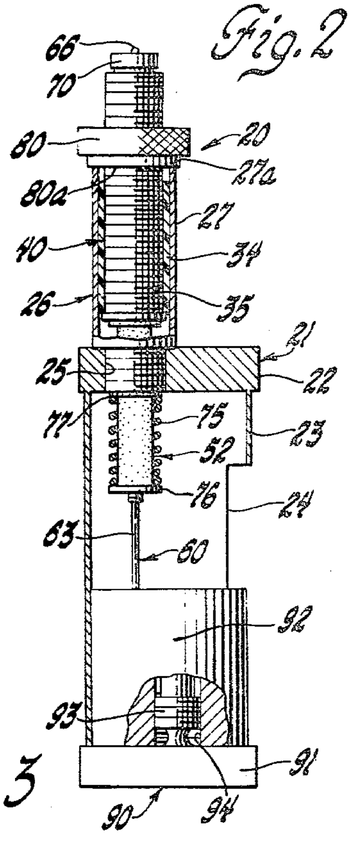

Referring now to the subject matter of the invention and in particular to FIGS. 2 and 3, the unit injector timing gage, generally designated 20 of the invention includes a gage base 21 of electrically conductive material that includes a circular base 22 with a cylindrical, hollow sleeve 23 of predetermined height depending therefrom. The wall of the sleeve 23 is provided with a through slot 24 extending upward from its lower free end, for a purpose to be described. The base 22 is provided with an internally threaded through bore 25, shown located off center to the axis of the sleeve in the embodiment illustrated.

A contact base 26, having an upper cylindrical portion 27 and a lower reduced diameter externally threaded, mounting base 28 is secured to the top of the gage base 21 by threaded engagement of the mounting base 28 in the bore 25.

The contact base 26, made of electrical conductive material, in the construction shown is provided with a stepped bore 30 therethrough to define an internal cylindrical upper wall 31 extending from the upper edge surface 27*a* of the contact base 26 and an internal cylindrical lower wall 32 extending through the mounting base 28. Wall 32 is of reduced internal diameter relative to the wall 31. Walls 31 and 32 are interconnected by a flat shoulder 33.

A cylindrical tubular upper guide 34 made of suitable electrical insulating material, is of a predetermined outside diameter so as to be slidably received in the portion of bore 30 defined by wall 31 in contact base 26 so as to, in turn, slidably guide a battery holder 40 for axial movement within the contact base 26. As shown, the internal wall of the upper guide 34 is provided with internal threads 35 along its full axial extent.

The battery holder 40 made of electrical conductive material is of cylindrical configuration with an externally threaded upper portion 41 that terminates at a flanged base 42. The battery holder 40 is provided with the stepped bore 43 therethrough to define, in succession starting with the top thereof with reference to FIG. 2, an internally threaded cylindrically upper wall 44, an intermediate cylindrical wall 45 defining a battery chamber 46 and an internally threaded lower wall 47. Walls 44 and 45 are interconnected by a shoulder 48. Walls 45 and 47 are interconnected by a flat shoulder 50. Walls 47 and 45 are of progressively reduced diameter relative to upper wall 44.

A lower guide 52, made of a suitable electrical insulating material, is operatively fixed to the battery holder 40 for movement therewith. In the construction shown, the lower guide 52 is of circular configuration when viewed in cross section and includes an upper externally threaded portion 53 that is threadedly received into the lower wall 47 of the battery holder 40, and a lower cylindrical portion 54 of an external diameter so as to be slidably received in the cylindrical lower wall 32 of the contact base 26. A radial outward extending shoulder 55 of the lower guide 52 is positioned between the threaded upper portion 53 and the lower cylindrical portion 54. Shoulder 55 is thus positioned to prevent electrical contact between the battery holder 40 and the contact base 26, thus serving to electrically insulate the contact base 26 from the battery holder 40 when the battery holder is in the position shown in FIG. 2. Lower guide 52 is also provided with a straight bore 56 extending axially therethrough, that is of a diameter so as to slidably receive the upper shank end of a contact pin 60.

Contact pin 60, made of electrical conductive material, includes an enlarged head 61 with an elongated shank 62 depending therefrom, the shank 62 terminating at its lower end at a reduced diameter shank portion 63. The shank portion 62 at its lower end next adjacent to the reduced portion diameter 63 is provided with external threads 64 for a purpose to be described.

As shown, the contact pin 60 is positioned in the lower guide 52 so that the lower surface of its head 61, with reference to the drawings, abuts against the upper end surface of the lower guide 52 whereby the head 61 is located to project into the battery chamber 46. The shank 62, including the reduced diameter portion 63, of the contact pin 60 are of an axial extent so that with contact pin positioned as shown in FIG. 2, a portion of the shank 62 and all of the lower shank portion 63 of the contact pin 60 project outward from the lower end of the lower guide 52 and from the contact base 26.

A suitable electrical battery 65, such as an AAA size battery in the construction illustrated, is positioned in the battery chamber 46 so that one pole, that is the + pole, at the bottom of the battery is in electrical contact with the head 61 of the contact pin 60. The opposite pole of the battery 65, that is the − pole, is thus positioned to permit it to be engaged by the base terminal of a suitable indicator bulb 66. The indicator bulb 66 is threadedly received in the internally threaded socket 67 of a circular disc-like bulb retainer 68.

Bulb retainer 68 is of a suitable external diameter whereby it can be loosely received in the portion of bore 43 defined by the upper wall 44 in the battery holder 40. Bulb retainer 68 is axially positioned relative to the battery 65 whereby to effect electrical contact between the base terminal of the indicator bulb 66 and the battery 65, by means of a hollow tubular bulb guide 70 that has a reduced diameter externally threaded shank 71 portion thereof adjustably engaged in the threaded upper wall 44 of the battery holder. Both the bulb retainer 68 and bulb guide 70 are made of suitable electrically conductive material. As shown, the bulb guide 70 is provided with an axial through bore 72 of an inside diameter properly sized to accommodate the particular indicator bulb 66 used in the timing gage.

The battery holder 40 with the above-described elements thus associated therewith is in a unit assembly with the contact pin 60 and therefrom moveable with the contact pin 60 for axial movement up and down movement within the contact base 26, with reference to the Figures.

The contact pin 60 and battery holder 40, as a unit assembly, are normally biased in a direction, a downward direction relative to the contact base with reference to the drawings, by means of a coil spring 75. In the embodiment illustrated, the spring 75 is positioned so as to loosely encircle the contact pin 60 with one end of the spring abutting against a washer-like spring seat 76 that is fixed to the shank 62 of the contact pin 60, for example as by being threaded onto the threads 64, thereon in the construction illustrated. The opposite end of the spring 75 is thus positioned to abut against an insulator washer 77, made of suitable electrical insulating material, that is sandwiched between the upper end of the spring 75 and the lower surface of the contact base 26.

A gage stop 80, in a form of a nut made of electrically conductive material, is adjustably threaded onto the externally threaded upper portion 41 of the battery holder 40. The gage stop 80 is of a suitable outside diameter so that the lower surface 80*a* thereof is of a diameter as large or preferably larger than the diameter of the upper edge surface 27*a* of the contact base 26 whereby to effect an electrical connection therebetween when these surfaces are brought into abutment with each other in a manner to be described.

Referring now to FIG. 3, there is shown a calibration gage, generally designated 90, that is adapted to be used to set the proper calibration of timing gage 20. The calibration gage 90 includes a base 91 and a calibration gage block 92, both made of electrically conductive material. Calibration gage block 92 is of circular configuration in the embodiment shown and has an outside diameter that is suitably less than the inside diameter of the sleeve 23 whereby the timing gage 20 with the sleeve 23 thereof can be positioned to loosely encircle the calibration gage block 92 as shown in FIG. 3 so as to have the free end of sleeve 23 abut against the upper surface of base 91 for a purpose to be described. The axial height of the calibration gage block 92 for a particular engine is made equal to the desired injector timing setting for that particular engine. This height can, for example, be established relative to a machined surfaces of the cylinder head 5 adjacent to each unit injector, or as shown, is established relative to a machined upper surface of the injector housing 14 of a unit fuel injector 10.

In the construction illustrated, the calibration gage block 92 is releasably fixed to the base 91 as by means of an upstanding externally threaded boss 93 of the base 91 being threadedly received in the central, internally threaded bore 92 that extends upward from the lower end, with reference to FIG. 3 of the calibration gage block 92.

In order to set the unit injector timing for a particular engine, the unit injector timing gage 20 is thus calibrated to the desired timing setting for that particular engine by use of an appropriate calibration gage 90. As shown in FIG. 3, the unit injector timing gage 20 with its sleeve 23 is installed over the calibration gage block 92 and this assembly is then depressed until the lower edge surface of the sleeve 23 contacts the base 91 of the calibration gage 90. As this occurs, the lower end of the contact pin 60 will abut against the top surface of the calibration gage block 92 forcing the assembly consisting of the contact pin 60, lower guide 52, upper guide 34, battery holder 40 and the elements associated therewith to move vertically upward within the contact base 26 against the biasing action of the spring 75. At this time, the indicator bulb 66 is not illuminated since the lower guide 52 and upper guide 34 are made of dielectric material, thus electrically insulating the injector timing contact pin 60 and the battery holder 40 respectively, from the contact base 26.

With the unit injector timing gage 20 and its sleeve 23 held firmly in place on the calibration gage 90, as shown in FIG. 3, the adjustable gage stop 80 is then screwed down on the threaded battery holder 40. When the gage stop 80 contacts the upper edge surface 27*a* of the contact base 26, an electrical circuit is completed and the indicator bulb 66 illuminates. The electrical current flow path is from one pole of the battery 65, through the injector timing contact pin 60, the calibration gage 90, the timing gage sleeve 23, the contact base 26, the adjustable gage stop 80, the battery holder 40, the bulb guide 70, the bulb retainer 68, the indicator bulb 66 to the opposite pole of the battery 65.

The insulator washer 77 between the spring 75 and the contact base 26 prevents short circuiting the electrical current flow from the path described above. Thus, the indicator bulb 66 will light only when the adjustable gage stop 80 makes initial contact with the contact base 26. If the gage stop 80 is further adjusted, after initially contacting the contact base 26, the other moveable components of the unit injector timing gage 20 including the contact pin 60 will lift vertically. The contact between the injector timing contact pin 60 and the calibration gage block 92 will then be broken and the indicator bulb 66 will extinguish since the only electrical circuit possible has been opened.

As a result, the subject unit injector timing gage 20 can neither be under nor over adjusted since the indicator bulb 66 will illuminate only when the gage stop 80 just contacts the gage contact base 26. Thus the height of the calibration gage block 92, which correspond to the desired injector timing dimension for a particular engine, can be accurately and repeatedly established on the timing gage 20.

Once the desired timing setting of the timing gage 20 is obtained on the calibration gage 90, the unit injector timing gage 20 and its timing gage sleeve 23 is then installed on a unit injector 10 of an engine, as shown in FIG. 1.

As illustrated, the timing gage sleeve 23 is slotted and therefore it can be placed over the injector follower and slipped down over the top of the unit injector 10 until the lower end of the time gage sleeve 23 contacts the top of the injector housing 14, in the embodiment shown. Thereafter, as the injector adjustment screw 18 is tightened, for example, to effect counter clockwise movement of the rocker arm 15, with reference to FIG. 3, to move the plunger follower 11 downward against the bias of the injector return spring 12. As this occurs, the injector timing contact pin 60 follows the downward travel of the injector plunger follower 11 as the return spring 12 is compressed by the rocker arm 15. At the point shown in FIG. 1 where the adjustable gage stop 80 contacts the upper edge surface 27*a* of the cylindrical portion 27 of the contact base 26, the indicator bulb 66 will be energized to thereby indicate to the mechanic that the desired injector timing setting has been reached.

It will be apparent that if the plunger follower 11 is axially moved to a position below the desired timing height for that injector 10, the contact pin 60 will then not be engaged with the head of the plunger follower even with the gage stop 80 abutting against the contact base 26. Therefore, the indicator bulb 66 will not be energized until the adjustment screw 18 is backed out sufficiently to permit clockwise movement of the rocker arm 15, with reference to FIG. 3, to allow upward movement of the plunger follower 11 as biased by the return spring 12. Under this condition, when the contact pin 60 then contacts the upper surface of the plunger follower 11, the indicator bulb 66 will be energized to thereby indicate that the desired injector timing setting has been established.

The embodiments of the invention in which an exclusive property or privilege is claimed are defined as follows:

1. A timing gage for use in setting the height and therefore the timing of the follower, reciprocally journaled in the housing of a unit injector that is mounted in an engine whereby a rocker arm in the drive train therefor can actuate the follower, the timing gage including an electrically conductive gage base including a base with an aperture therethrough and a slotted sleeve depending therefrom which is adapted to loosely encircle the follower and have its free end abut against a fixed element of the engine; an electrically conductive contact base of hollow tubular configuration fixed at one end to said base; an electrically insulating sleeve means slidably positioned in said contact base; an electrically conductive battery holder means slidably positioned in said contact base and normally electrically insulated therefrom by said sleeve means, said battery holder means being adapted to receive an electrical battery and having one end thereof provided with a light socket means; a light bulb operatively positioned in said light socket means with a terminal end thereof adapted to engage a terminal of the battery; an electrical contact pin fixed to the opposite end of said battery holder means so as to have one end thereof extending axially downward therefrom through said aperture into said slotted sleeve for engagement with the follower of the unit injector, the opposite end of said contact pin being adapted to engage the other terminal of the battery, said battery holder means having an annular radially outward extending, axially adjustable flange means adjacent said one end thereof adapted to be in an abutting interference relation with the opposite end of said contact base upon axial movement of said battery holder means relative to said contact base whereby when said flange means abuts against said contact base an electrical circuit is completed from one terminal of the battery via said contact pin, the unit injector housing, said sleeve member, said gage base, said battery holder means, said light bulb to the opposite terminal of the battery, and a spring means electrically insulated from but operatively associated with said battery holder means and said gage base to normally bias said battery holder means in one axial direction relative to said contact base to normally move said flange toward abutment against said contact base.

2. A timing gage for use in setting the height and therefore the timing of the follower of a unit injector mounted in an engine whereby a rocker arm in the drive train thereof can actuate the follower; the timing gage including a gage base means of electrically conductive material which is adapted to loosely encircle the follower so as to abut against a fixed element of the engine; said gage base means including a hollow tubular contact base portion; a sleeve means of electrically insulating material slidably positioned in said contact base portion; an electrically conductive battery holder means slidably positioned in said contact base portion and normally electrically insulated therefrom by said sleeve means, said battery holder means being adapted to receive an electrical battery and having one end thereof provided with a light socket means; a light bulb operatively positioned in said light socket means with a terminal end thereof adapted to engage a terminal of the battery; an electrical contact pin fixed to the opposite end of said battery holder means so as to have one end thereof extending axially downward therefrom for engagement with the follower of the unit injector, the opposite end of said contact pin being adapted to engage the other terminal of the battery, said battery holder means having an annular radially outward extending, axially adjustable flange means adjacent said one end thereof adapted to be in an abutting interference relation with a free end of said contact base portion upon axial movement of said battery holder means relative to said contact base portion in one direction whereby when said flange means abuts against said contact base an electrical circuit is completed from one terminal of the battery via said contact pin, the unit injector housing, said gage base means, said battery holder means and said light bulb to the opposite terminal of the battery, and a spring means electrically insulated from but operatively associated with said battery holder means and said gage base to normally bias said battery holder means axially in said one direction relative to said contact base to normally move said flange toward abutment against said free end of said contact base portion.

3. A timing gage for use in setting the height and therefore the timing of the follower of a unit injector that is mounted in an engine whereby a rocker arm in the drive train thereof can actuate the follower; the timing gage including an electrically conductive gage base means having a base means with an aperture therethrough adapted to be positioned adjacent to the follower and have its free end abut against a fixed element of the engine; and an upstanding contact base portion of hollow tubular configuration; an electrically insulating sleeve means slidably positioned in said contact base portion; an electrically conductive battery holder means slidably positioned in said contact base portion and normally electrically insulated therefrom by said sleeve means, said battery holder means being adapted to receive an electrical battery and having one end thereof provided with a light socket means adapted to receive a light bulb so that a terminal end thereof is adapted to engage a terminal of the battery; an electrical contact pin fixed to the opposite end of said battery holder means so as to have one end thereof extending axially downward therefrom through said aperture for engagement with the follower of the unit injector, the opposite end of said contact pin being adapted to engage the opposite terminal of the battery, said battery holder means having external threads at said one end, flange nut means adjustably threaded on said one end of said battery holder means in position for abutting interference relation with the free end of said contact base portion upon axial movement of said battery holder means in one direction relative to said contact base portion whereby when said flange nut means abuts against said contact base an electrical circuit is completed from one terminal of the battery via said contact pin, the unit injector housing, said gage base means, said battery holder means, said light bulb to the opposite terminal of the battery; and, a spring means electrically insulated from but operatively associated with said battery holder means and said gage base portion to normally bias said battery holder means in one axial direction relative to said contact base portion to normally move said flange toward abutment against said contact base portion.

* * * * *